United States Patent [19]
Beresford et al.

[11] Patent Number: 6,145,615
[45] Date of Patent: Nov. 14, 2000

[54] MECHANICAL FILTER

[75] Inventors: John Michael Beresford, Sherbourne; Paul Andrew Crowther, London, both of United Kingdom

[73] Assignee: Thomson Marconi Sonar Limited, Middlesex, United Kingdom

[21] Appl. No.: 09/155,171

[22] PCT Filed: Mar. 12, 1997

[86] PCT No.: PCT/GB97/00682

§ 371 Date: Apr. 19, 1999

§ 102(e) Date: Apr. 19, 1999

[87] PCT Pub. No.: WO97/36191

PCT Pub. Date: Oct. 2, 1997

[30] Foreign Application Priority Data

Mar. 22, 1996 [GB] United Kingdom .................... 9606053

[51] Int. Cl.[7] ....................................................... G01V 1/40
[52] U.S. Cl. ............................. 181/102; 181/106; 367/25
[58] Field of Search .................................... 181/102–106; 367/25, 911, 912, 82, 157

[56] References Cited

U.S. PATENT DOCUMENTS

| 2,685,822 | 8/1954 | Walton . |
| 2,897,478 | 7/1959 | Summers et al. . |
| 4,050,665 | 9/1977 | Matthews et al. . |
| 4,066,995 | 1/1978 | Matthews et al. . |
| 4,130,185 | 12/1978 | Densmore . |
| 5,373,481 | 12/1994 | Orban et al. ............................ 367/82 |
| 5,387,767 | 2/1995 | Aron et al. . |
| 5,510,582 | 4/1996 | Birchak et al. . |

FOREIGN PATENT DOCUMENTS

| 10 47 459 | 1/1978 | Germany . |
| 63067440 | 3/1988 | Japan . |
| 2 288 020 | 10/1995 | United Kingdom . |

OTHER PUBLICATIONS

Patent Abstracts of Japan, vol. 012, No. 292 (M–729) Aug. 10, 1988.

*Primary Examiner*—Khanh Dang
*Attorney, Agent, or Firm*—Venable; Robert J. Frank; Robert Kinberg

[57] ABSTRACT

A drill string assembly containing a section of tube with a first end. The first end directly, mechanically links a drill pipe to a drill bit and transmits rotational forces from the drill pipe to the drill bit during drilling. A spring is connected to the section of tube at a point remote from the first end of the section of tube. A mass is connected to the spring such that the mass can vibrate on the spring in an axial direction relative to the section of tube and drill string. The value of the mass and the stiffness of the spring being selected such as to cause them to act as a mechanical filter and damp longitudinal compression waves at a predetermined frequency of frequency band and received at the first end of the section of tube.

13 Claims, 5 Drawing Sheets

MECHANICAL FILTER

BACKGROUND OF THE INVENTION

The present invention relates to a drill string sub assembly comprising a mechanical filter.

Logging while drilling (LWD) apparatus is disclosed in U.S. Pat. No. 5,387,767 which enables acoustic signals to be transmitted to rock about a borehole, while minimising the energy transmitted into the drill collar. However, when drilling a borehole it may be desirable to know the stratum which is about to be drilled through, that stratum immediately ahead of the drill bit. This allows appropriate drilling parameters to be employed such as drill speed or the weight on the bit. This is particularly important when drilling for oil, for it enables over pressure regions in the stratum ahead of the drill bit to be identified and the fluid pressure within the borehole adjusted to a minimum safe level accordingly.

UK patent application, publication number 2288020 discloses a drill bit arrangement embodying an acoustic transducer which enables acoustic signals to be transmitted and received through the drill bit itself. This enables the region ahead of the drill bit to be surveyed without the very expensive requirement of withdrawing the drill string and lowering a wire-line tool down the borehole including an acoustic sensor to survey the bottom of the borehole. The apparatus described in UK patent application publication number 2288020 discloses that it is necessary to isolate the drill bit and acoustic transducer from the drill string in order to prevent excessive losses in transmitted and received signals from and to the transducer, caused by transmission along the drill string, and also to avoid problems caused by signals being returned along the drill string or reflected by the drill string.

This earlier application discloses two embodiments for isolating the drill bit and acoustic sensor from the drill string, and further development work on these resulted in the design illustrated in FIG. 1 of the attached drawings, the essential elements of which are briefly summarised below.

Referring to FIG. 1, a drill bit 10 is connected to a first hollow member 11 which slidably extends within second hollow member 12. Two sets of rubber coated splines 13 on the two respective hollow members engage and act to centralize the two members in the absence of any torque applied to the drill string, while two sets of steel splines 14 associated with each respective hollow member engage when high torque loads are applied during drilling to transmit torque from the drill string to the drill bit. A series of steel balls 15 engage with recesses 16 in the first hollow member and act to limit the relative separation of the two hollow members.

During a drilling operation the downward force exerted by the drill string causes the faces 17 of the two hollow members to come into contact such that the weight on the drill string is applied directly to the drill bit. When it is desired to survey the area of rock ahead of the drill string the weight on the drill string is reduced such that the first and second hollow members extend and adopt the position illustrated in FIG. 2. Compliances 18 acting between the first and second hollow members act to maintain a desired pressure on the drill bit to ensure good acoustic transmission between the drill bit and the rock surface it is in contact with, but in this position there is no direct metallic contact between the drill string and the drill bit. Piezo-electric elements 19 transmit a signal into the drill bit, the piezo-electric elements acting against reaction mass 20. After a short transmission signal a return signal is received via the drill bit and piezo-electric elements 21.

The problem with the arrangement illustrated in FIG. 1 is that it has to work in a very hostile environment in a borehole where various rubber components, seals and moving joints are subjected to very abrasive mud flow, high temperatures and pressures, and also a chemically hostile environment. This is particularly a problem because failure of the apparatus may result in a considerable down time while the drill string is removed and then replaced.

SUMMARY OF THE INVENTION

According to a first aspect of the present invention there is provided a drill string sub assembly comprising a section of tube, a spring connected to the tube at a point remote from a first end of the section of tube, and a mass connected to the spring such that it can vibrate on the spring in an axial direction relative to the tube, the value of the mass and stiffness of the spring being selected such as to act as a mechanical filter and damp longitudinal compression waves at a predetermined frequency or frequency band received at the first end of the section of tube.

A drill string sub assembly in accordance with the invention employing a mass on a spring (which spring may be of any suitably resilient coupling, for example an annular disk with a mass supported at its inner periphery or may comprise the stiffness of a portion of the section of tube itself to which the mass is attached) enables the first portion of a drill string subjected to longitudinal compression waves to be mechanically isolated from a second portion at particular frequencies. This is particularly advantageous because it provides a means of preventing transmission of longitudinal compression waves in a drill string without the need to provide a mechanical break.

Preferably the spring is an annular member located coaxially with the tube and is secured at a radially outer edge to the tube and at a radially inner edge to the mass. This enables the mass to act uniformly on the tube in a plane perpendicular to the axis of the tube. The same advantage may be achieved if the radially inner edge of the spring is mounted to the outer surface of the tube whereby the mass would then be located externally of the tube.

Preferably the filter comprises at least two springs connected to axially separated points of the tube with each spring connected to a respective mass. This is particularly advantageous if the springs are of different stiffnesses and/or the masses are of different values, for then the respective spring/mass combinations will act to suppress different frequencies and cause the filter to act as a band stop filter over a range of frequencies. Various mass spring combinations can be built up to act in a manner analogous to electrical inductive/capacitive components in a ladder network.

In accordance with a second aspect of the invention there is provided a drill string comprising borehole surveying apparatus and a drill string sub assembly in accordance with the first aspect of the invention for acoustically isolating at least a portion of the surveying apparatus from the drill string. The section of tube of the filter enables the portion of surveying apparatus to be connected to the drill string whilst enabling the portion to be acoustically isolated at particular frequencies from the drill string. This is particularly advantageous if that portion of the surveying apparatus comprises surveying equipment which may either monitor for acoustic signals or transmit and/or receive acoustic signals, and which therefore needs to be isolated from the drill string to prevent either interference by signals received via the drill string, or loss of a transmitted signal through the drill string.

According to a third aspect of the invention there is provided a drill string comprising a drill bit; an acoustic transducer arranged to vibrate the drill bit such that acoustic signals are transmitted into rock ahead of the drill bit; and a drill string sub assembly in accordance with the first aspect of the invention, arranged such as to isolate the remainder of the drill string from signals generated by the acoustic transducer. This is particularly advantageous, for as discussed in the introductory portion of this specification, there are certain applications where it is desirable to transmit an acoustic signal via a drill bit and where it is necessary therefore to acoustically isolate the drill bit from the remainder of the drill string. However, it is necessary that any such isolation means also enables a very high torque to be transmitted to the drill bit during a drilling operation and also ensures very high compressional and tensile forces can be applied between the drill string and drill bit.

Employing a drill string in accordance with the present invention enables acoustic isolation between a drill bit and drill string to be achieved without having to employ the mechanical break disclosed in the apparatus illustrated in FIG. 1 and the inherent problems associated with the necessary seals and the like, which lead to reliability problems in such a hostile environment.

Employing the present invention the drill bit is mechanically connected to the drill string via the section of tube of the drill string sub assembly such that mechanical forces are transmitted directly from the drill string to the drill bit via the section of tube, the thickness of the wall of the section of tube having a low compliance relative to the wall of the drill string, which permits acoustic decoupling in combination with the mass/spring combinations. Preferably the mass, or each mass, is annular and arranged around the inner surface of the section of tube, the filter being arranged such that drilling mud can flow through its centre. In this way the filter effectively provides a continuation of the drill string enabling the drilling mud to be transmitted to the drill bit.

The spring may have a very high stiffness depending on the value of the associated mass and frequency of the transducer. In certain applications the spring may comprise at least in part the section of tube itself, in that the tube may flex about the point at which the mass is connected.

Preferably the centre of gravity of each mass is between the point at which the mass is connected to the spring and the drill bit. It is necessary for there to be a certain compliance in the section of tube between its first end and the point at which it is connected to the mass. Having the centre of gravity of the mass between its point of connection to the spring and the drill bit minimises the distance the mass need extend the other side of the spring and therefore minimises the overall length of the mechanical filter.

Preferably the apparatus further comprises: an inner tube which in use isolates the mass from the drilling mud, which tube is sealed about the mass to define a volume between the inner tube and the inner surface of the section of tube, in which volume the mass is located, this volume being filled with a fluid. The apparatus also comprises means for maintaining the fluid at a pressure substantially equal to the pressure on the outer surface of the section of tube. The outer surface of the tube is subjected to very high pressures, and thereby maintaining a fluid which acts against the inner surface of the section of tube at a pressure equal to the external pressure ensures that the tube is not distorted.

One embodiment of the present invention will now be described, by way of example only, with reference to FIGS. 2, 3 and 4 of the accompanying drawings, of which:

DETAILED DESCRIPTION OF THE DRAWINGS

Figure 1:
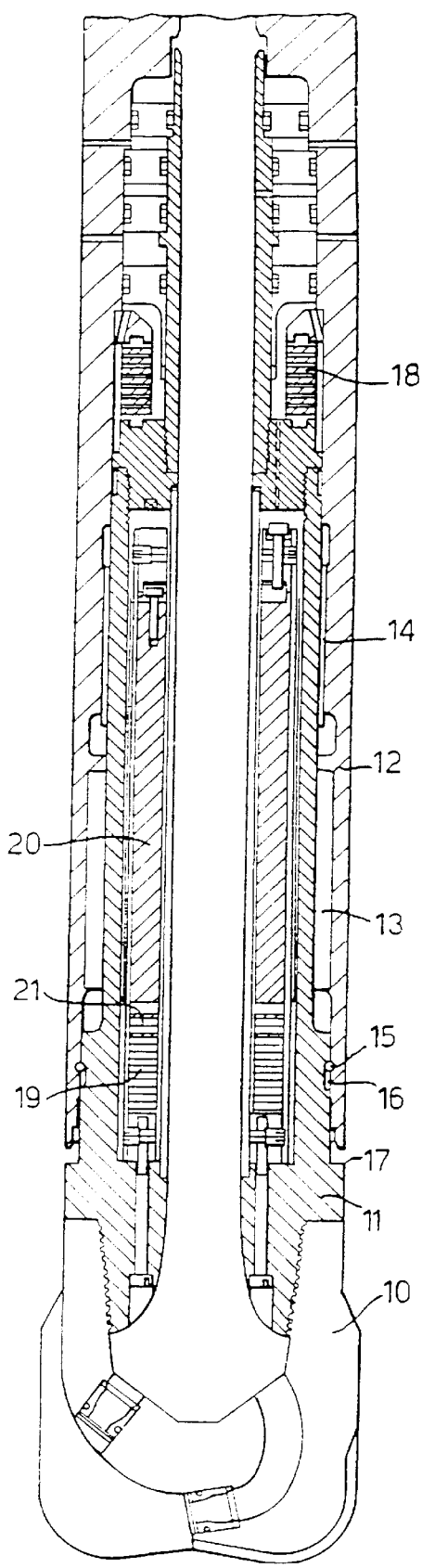
FIG. 1 illustrates a previous device schematically.
Figure 2:
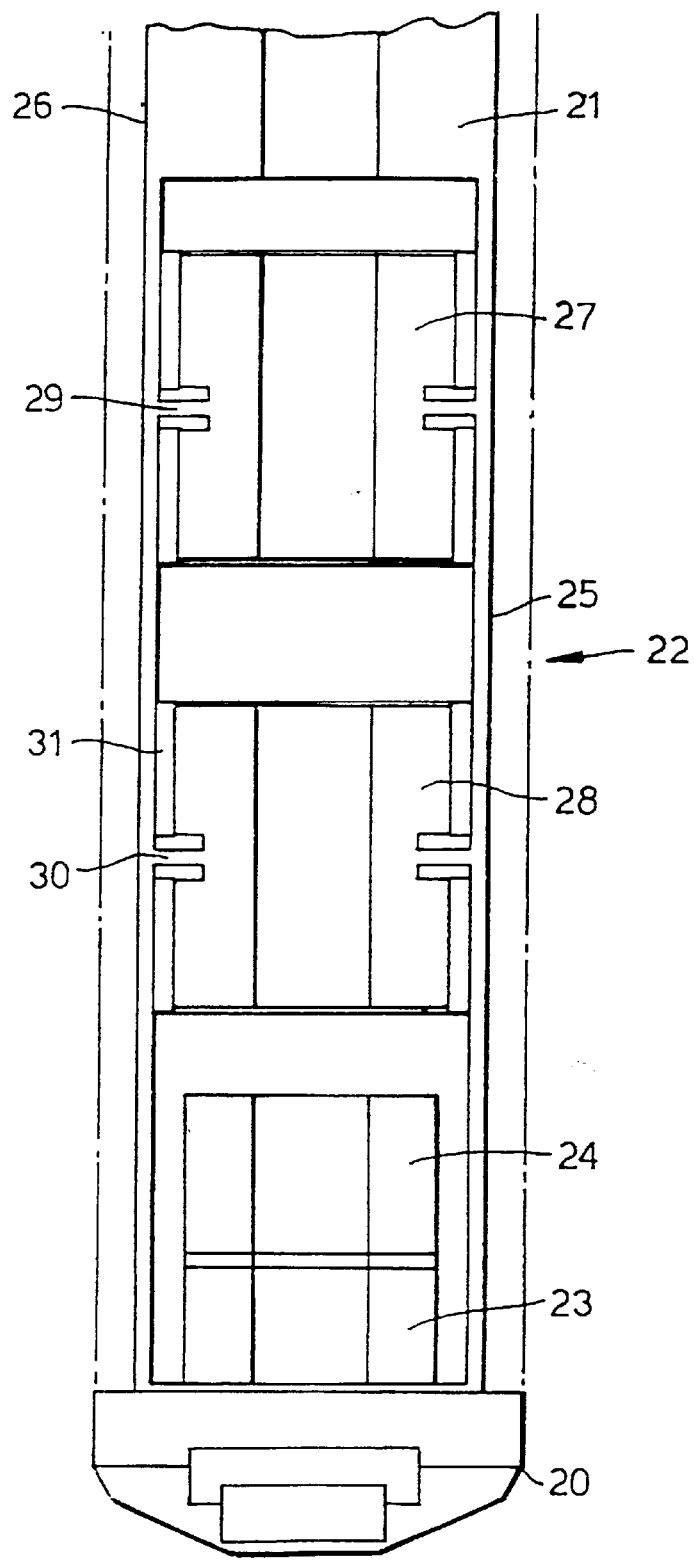
FIG. 2 illustrates schematically the principal components of the mechanical filter employed in the borehole drilling apparatus illustrated in FIG. 3.

Referring to FIG. 2 there is schematically illustrated borehole drilling apparatus comprising a drill string sub assembly in accordance with a first aspect of the present invention, the apparatus comprising a drill bit 20 connected to drill string 21 via drill string sub assembly which acts as a mechanical filter, indicated generally as 22. Attached to the drill bit is an acoustic transducer comprising ceramic stack 23 which acts against reaction mass 24 to transmit acoustic signals into the drill bit, which signals are then propagated into the rock (not shown) to be drilled. The filter 22 comprises a cylindrical tube 25 which has a relatively thin compliant wall relative to the thickness of the wall of the drill string 26. Annular masses 27 and 28 are connected to tube 25 of the filter via springs 29, 30 which are in the form of annular washers, the outer periphery of which is welded to the tube 25 with the inner periphery welded to the associated mass. A layer of compliant material 31 extends between the tube and the masses in order to ensure that excessive loads are not placed on the springs 29, 30 in transit or during abnormal conditions, but the compliance of the material is such as to have a negligible effect on the resonant properties of the spring/mass pairs 29, 27 and 28, 30.

The stiffness of the springs 29, 30 and the value of their respective masses is selected such that they define a blocking frequency within the frequency range at which the transducer 23 is operated. The blocking angular frequency $\omega_n$ of the nth mass spring combination is determined as $$\omega_n = \sqrt{K_n/M_{B,n}} \qquad (1)$$

where $K_n$ is the nth spring constant, $M_{B,n}$ is the nth blocking mass.

The two masses and/or spring constants are preferably of different values such that a blocking function is achieved over a broader range of frequencies. The position of the masses is not critical but the masses will be more effective the more compliance there is in the section of the tube of the filter between the point at which the mass is connected and the drill bit. Similarly there needs to be sufficient compliance in the section of tube between the two springs to avoid interaction between the two masses.

Figure 3A:
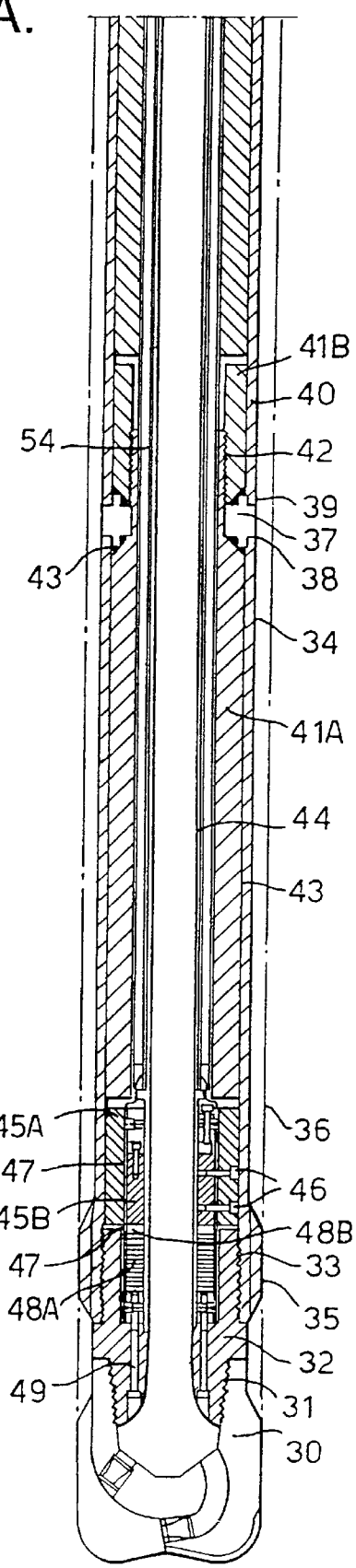
FIGS. 3(A,B) are longitudinal cross-sections through drilling apparatus in accordance with a third aspect of the present invention.
Figure 3B:
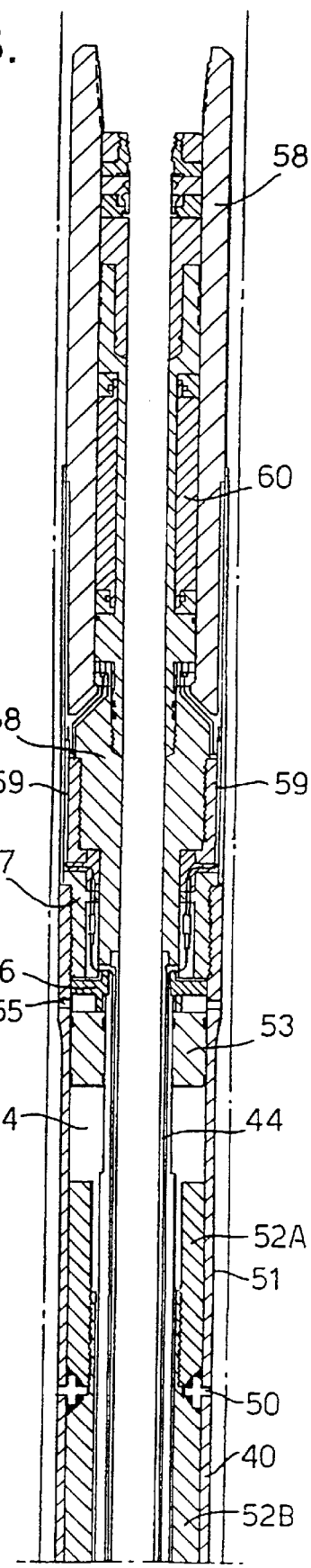

Referring now to FIGS. 3a and 3b, there is shown respectively in cross-section the lower part and upper part of drilling apparatus employing a practical implementation of the filter illustrated schematically in FIG. 2. Referring to FIG. 3a, drill bit 30 is connected by tapered screw thread 31 to adaptor 32 which is in turn connected by screw thread 33 to a first compliance section 34. First compliance section 34 comprises a thin cylindrical tube of a material having a high strength:mass ratio and a relatively low Young's Modulus, such as titanium. Around the lower portion of the first compliance section is a metallic band termed the near bit stabiliser which follows the wall of the borehole, indicated by broken line 36, and acts to stabilise the drill bit during drilling. The first compliance section 1 extends vertically, as shown in the drawing, to first annular spring 37 to which it is welded at 38. To the other side of the annular spring 37 is welded at 39 a second compliance section 40 having the same properties as the first compliance section.

To the inner surface of the first annular spring is attached a first annular mass 41 comprising portions 41a and 41b joined together by respective threaded portions 42 such as to sandwich the first annular spring and thereby retain the mass 41 in place. Between the mass 41 and first and second compliance members 34 and 40 there is a layer of compliant material 43 such as rubber which serves to prevent the mass 41 "rattling" within the compliance sections.

Within the passage defined by the annular mass 41 is a mud flow pipe 44 which as can be seen from FIG. 3b extends from the drill string to the adaptor 32 and conveys mud to the drill bit 30.

Located below the mass 41 is reaction mass 45 comprising a dense material, for example tungsten. The reaction mass 45 comprises two parts 45a and 45b between which are sandwiched straps 47. The two parts of the reaction mass are bolted together by bolts 46.

The bias straps 47 extend to the far end of piezo-electric transducer 48 and maintain piezo-electric elements comprising the piezo-electric stack in compression. The piezo-electric transducer 48 comprising transmitter elements 48a and receiving elements 48b. The transducer is securely affixed to adaptor 32 by bolts 49, and therefore in turn to drill bit 30.

Referring now to FIG. 3b, the second compliance member 40 is seen to extend to second annular spring 50 to which it is welded, the spring also being welded to third annular compliance member 51. It should be noted that the second annular spring 50 is less substantial than the first annular spring and therefore has a lower stiffness constant. Spring 50 supports annular mass 52 comprising portions 52a and 52b in the same manner as first annular mass 41 is supported by first annular spring 37. The mud flow pipe 44 is sealed at its upper end with the upper portion of the third compliance section 51 via annular piston 53. The volume 54 formed between the three respective compliance sections and the mud flow pipe, in which volumes the annular masses are located, is filled with oil which is maintained at a pressure equal to that of the mud in the borehole external to the compliance sections, this pressure being exerted by mud entering through aperture 55 exerting a force on piston 53. Bulkhead 56 seals the mud flow pipe 44 to the third compliance section 51.

The top of the third compliance section is threaded to connector ring 57 which in turn is threaded to insert ring 58. This can be considered as the start of the drill string. Insert ring 58 comprises electronic modules 59 for processing and transmitting signals received from the acoustic transducer via wires 59 which run via slots in the drill pipe 44 to the transducer 48. The insert ring 58 connects to the bottom of the steel drill pipe which forms the rest of the drill string.

Drilling would be paused while the transducer is in operation and the weight on the drill bit varied in the same manner as disclosed in the earlier UK patent application.

The material of the annular masses depends on the relative dimensions and the required mass and could for example be steel. The same applies for the first and second annular rings where the material used would depend on the stiffness required but it may be appropriate to use the same material as the compliance sections to which they are welded.

As previously stated the exact value of the various components will depend upon the application but could be derived by an appropriately skilled engineer in this field. However, typical values are given below for a standard 8.5" drill bit attached via a filter to a standard 8.75" drill collar, the filter being designed to reject the −30 dB level over at least 1,000 to 2,000 Hz frequency band. Typical characteristics of a suitable two stage filter are as follows.

Terminating collar material: Steel
Collar density 7800 kg/m3
Collar wave speed 5190 m/s
Thinwall Material: Titanium
Thinwall density 4510 kg/m3
Thinwall wave speed 4614 m/s
Common outer radius for filter section and collar wall 0.09 m.
Thinwall thickness 10 mm
Collar wall thickness 31.5 mm
Annular Mass Material: Steel
Density of mass metal 7800 kg/m3
Wavespeed in mass metal 5190 m/s
Outer radius in mass metal 0.077 m
Inner radius in mass metal 0.046 m. Mass/unit length therefore=93.44 kg/m
Number of stages in filter 2.
Length of compliance sections:
First=0.914 m
Second=0.758 m
Third=0.354 m
Mass lengths 0.807 m (first) and 0.689 m (second)
Blocking masses
First=75.4 kg
Second=64.3 kg
Blocking resonant frequencies
First=2087 Hz
Second=794 Hz Basic blocking frequency formula is $f=(K/M)^{1/2}/(2\pi)$, where K=spring constant, and M=blocking mass. NB for very long masses, consideration has to be given to standing wave effects in the masses to get a precise value for the spring constant, the determination of which thus becomes more complicated.

In the present example, the blocking spring constants, $K_n$ are thus approximately $$K_1 = 1.3.10^{10} \text{ N/m}$$

and $$K_2 = 1.6.10^{10} \text{ N/m}$$

Figure 4:
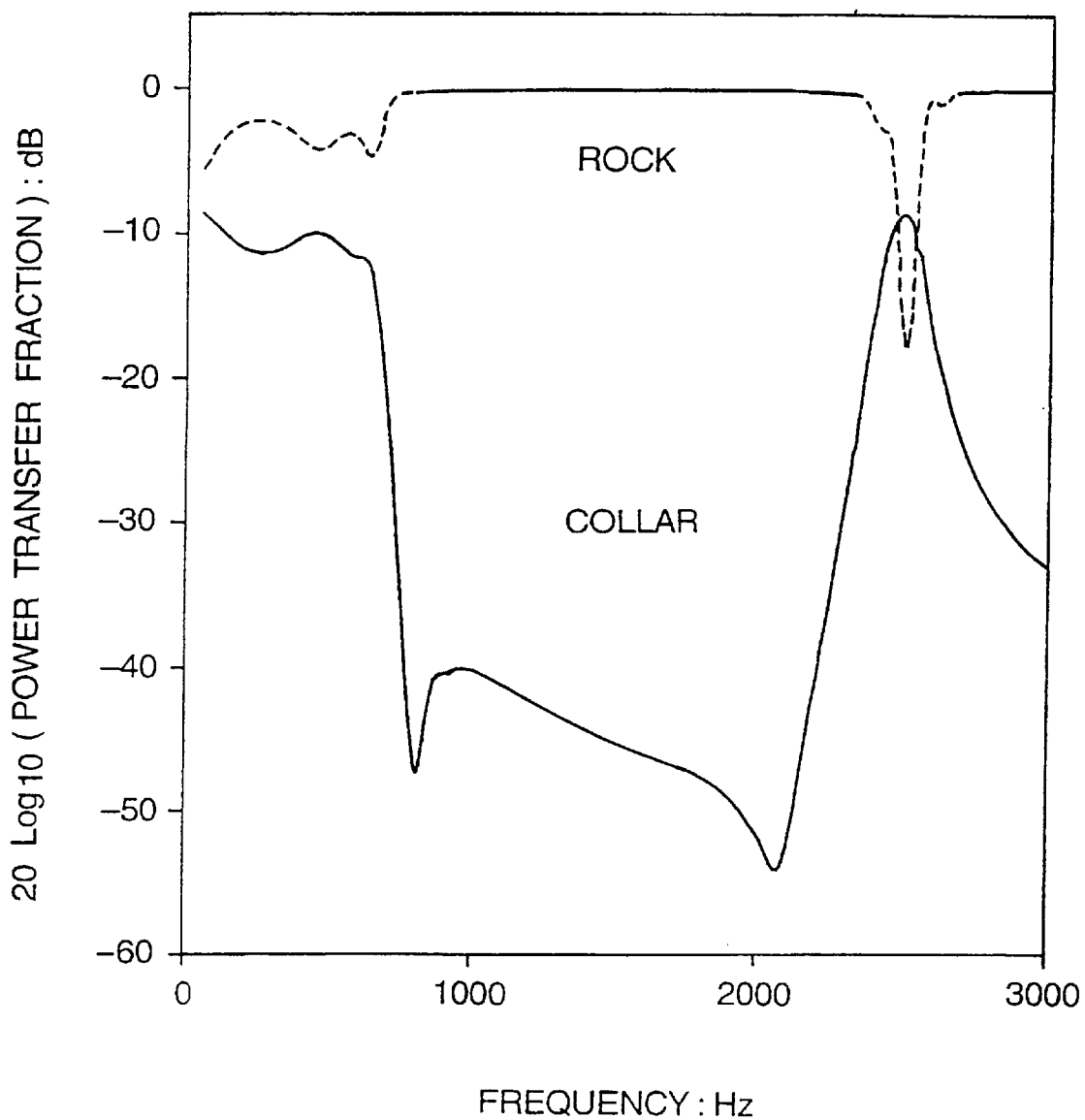
FIG. 4 illustrates the modelled performance characteristics of the apparatus illustrated in FIG. 3.

FIG. 4 illustrates the modelled fractions of total power emerging from the transducer which go respectively into the rock and into the drill collar, expressed in decibel terms, and plotted as functions of frequency. The band-stopping action of this two stage filter is evident between about 800 Hz and 2200 Hz. The two individual blocking frequencies are visible as minima in the lower curve.

The present invention has been described with reference to an application of drilling apparatus. However the mechanical filter aspect of the invention may be used in other applications within the scope of the claims appended hereto.

What is claimed is:

1. A drill string assembly comprising:
   a section of tube, with a first end, wherein the first end directly, mechanically links a drill pipe to a drill bit and transmits rotational forces from the drill pipe to the drill bit during drilling;
   a spring connected to the section of tube at a point remote from the first end of the section of tube; and
   a mass connected to the spring such that the mass can vibrate on the spring in an axial direction relative to the section of tube and drill string, the value of the mass and the stiffness of the spring being selected such as to cause them to act as a mechanical filter and damp longitudinal compression waves at a predetermined frequency of frequency band and received at the first end of the section of tube.

2. A drill string sub assembly as claimed in claim 1 wherein the spring is an annular member located coaxially with the tube and is secured at a radially outer edge to the tube and at a radially inner edge to the mass.

3. A drill string sub assembly as claimed in claim 1 comprising at least two springs connected to axially separated points of the tube with each spring connected to a respective mass.

4. A drill string sub assembly as claimed in claim 3 wherein the springs are of different stiffnesses.

5. A drill string sub assembly as claimed in claim 3 wherein the masses are of different values.

6. A drill string comprising:
   borehole surveying apparatus; and
   a drill string sub assembly as claimed in claim 1, the drill string sub assembly acoustically isolating at least a portion of the borehole surveying apparatus from the remainder of the drill string.

7. A drill string as claimed in claim 6 comprising an acoustic transducer, wherein the drill string sub assembly is tuned such that it acts as a band stop filter in the frequency range of the acoustic transducer.

8. A drill string comprising: a drill bit; an acoustic transducer arranged to vibrate the drill bit such that acoustic signals are transmitted into rock ahead of the drill bit; and a drill string sub assembly as claimed in claim 1 arranged such that it acts to isolate the remainder of the drill string from signals generated by the acoustic transducer.

9. A drill string as claimed in claim 8 wherein the drill string sub assembly is tuned such that it acts as a band stop filter in the frequency range of the acoustic transducer.

10. A drill string as claimed in claim 8 wherein the drill bit is mechanically connected to the remainder of the drill string via the section of tube of the drill string sub assembly such that in use mechanical forces are transmitted to the drill bit via the section of tube, the thickness of the wall of the section of tube having a low compliance relative to the wall of the remainder of the drill string.

11. A drill string as claimed in claim 9 or 10 wherein the mass is annular and arranged around the inner surface of the section of tube, the drill string sub assembly being arranged such that drilling mud can flow through its centre.

12. A drill string as claimed in claim 11 wherein the centre of gravity of the mass is between the point at which the mass is connected to the spring and the drill bit.

13. A drill string as claimed in claim 11 further comprising: an inner tube which isolates the mass from the mud and which is sealed about the mass to define a volume between the inner tube and the inner surface of the section of tube, in which volume the mass is located, this volume being filled with a fluid; and means for maintaining the fluid at a pressure substantially equal to the pressure on the outer surface of the section of tube.

* * * * *